(12) United States Patent
Ma

(10) Patent No.: US 8,213,369 B2
(45) Date of Patent: Jul. 3, 2012

(54) METHOD AND SYSTEM FOR OBTAINING HOME AGENT INFORMATION OF A MOBILE NODE

(75) Inventor: Yuzhi Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 851 days.

(21) Appl. No.: 12/044,358

(22) Filed: Mar. 7, 2008

(65) Prior Publication Data

US 2008/0165756 A1 Jul. 10, 2008

Related U.S. Application Data

(63) Continuation of application No. PCT/CN2006/001296, filed on Jun. 13, 2006.

(30) Foreign Application Priority Data

Sep. 7, 2005 (CN) .......................... 2005 1 0098647

(51) Int. Cl.
 *H04W 4/00* (2009.01)
(52) U.S. Cl. ... 370/329; 370/341; 370/349; 370/395.31; 370/395.54; 370/401
(58) Field of Classification Search .................. 370/329, 370/341, 349, 395.3, 395.31, 395.54, 401, 370/475
See application file for complete search history.

(56) References Cited

U.S. PATENT DOCUMENTS

| | | | |
|---|---|---|---|
| 7,299,044 B2 | 11/2007 | Ikeda et al. | |
| 7,461,169 B2 * | 12/2008 | Chandra et al. | 709/245 |
| 7,496,057 B2 * | 2/2009 | Patel et al. | 370/310 |
| 2002/0057657 A1 * | 5/2002 | La Porta et al. | 370/331 |
| 2003/0045287 A1 | 3/2003 | Taniguchi | |

(Continued)

FOREIGN PATENT DOCUMENTS

CN 1547411 A 11/2004

(Continued)

OTHER PUBLICATIONS

3rd Office Action in corresponding European Application No. 06 752 934.7 (Dec. 30, 2011).

(Continued)

*Primary Examiner* — Marsha D Banks Harold
*Assistant Examiner* — Alvin Zhu
(74) *Attorney, Agent, or Firm* — Leydig, Voit & Mayer, Ltd.

(57) ABSTRACT

Embodiments of the invention provide a method and a system for obtaining home agent information of a mobile node. The method includes: when a DHCPv6 server receives a request message from a mobile node, it obtains the home agent information of the mobile node; the DHCPv6 server includes the home agent information into the response message, and sends the response to the mobile node. With embodiments of the present invention, a mobile node may obtain its home agent information (such as its home agent address information) simultaneously when it requests related information. When the request message is a home address request message or a care-of address request message, the invention provides a clearly defined process for a mobile node to obtain home agent information when it is started up on a home link or foreign link. The invention avoids a special message interaction procedure to obtain home agent information. It increases the efficiency in obtaining home agent information, refines the RFC and improves the handover speed of the mobile node.

12 Claims, 4 Drawing Sheets

U.S. PATENT DOCUMENTS

| | | | |
|---|---|---|---|
| 2003/0065571 A1 | 4/2003 | Dutta | |
| 2003/0095540 A1 | 5/2003 | Mulligan et al. | |
| 2003/0101217 A1 | 5/2003 | Aiyoshi et al. | |
| 2004/0057440 A1* | 3/2004 | Thubert et al. | 370/401 |
| 2004/0148364 A1* | 7/2004 | Kim et al. | 709/217 |
| 2004/0179539 A1* | 9/2004 | Takeda et al. | 370/401 |
| 2004/0218573 A1* | 11/2004 | Takahashi et al. | 370/338 |
| 2005/0101321 A1 | 5/2005 | Ikeda et al. | |
| 2005/0111380 A1* | 5/2005 | Adrangi et al. | 370/254 |
| 2006/0280179 A1* | 12/2006 | Meier | 370/389 |
| 2008/0043758 A1* | 2/2008 | Giaretta et al. | 370/400 |

FOREIGN PATENT DOCUMENTS

| | | |
|---|---|---|
| CN | 1929497 B | 7/2010 |
| EP | 1 139 634 A2 | 10/2001 |
| EP | 1523154 A1 | 4/2005 |
| WO | WO 2004/014027 A2 | 2/2004 |
| WO | WO 2004/056046 A1 | 7/2004 |

OTHER PUBLICATIONS

Alexander et al., "DHCP Options and BOOTP Vendor Extensions," Network working Group Internet Draft, Nov. 1995, Lachman Technology, Inc., Naperville, Illinois.

Ohba et al., "Mobile IPv6 Bootstrapping Architecture Using DHCP," Network working Group Internet Draft, Oct. 17, 2004, The Internet Society, Reston, Virginia.

Written Opinion of the International Searching Authority in corresponding PCT Application No. PCT/CN2006/001296 (Sep. 21, 2006).

International Search Report in corresponding PCT Application No. PCT/CN2006/001296 (Sep. 21, 2006).

$1^{st}$ Office Action in corresponding Chinese Application No. 2005100986473 (Feb. 6, 2009).

$1^{st}$ Office Action in corresponding European Application No. 06752934.7 (Sep. 2, 2009).

2nd Office Action in corresponding European Application No. 06752934.7 (May 12, 2011).

Extended European Search Report in corresponding European Application No. 06752934.7 (Aug. 20, 2008).

Devarapalli et al., "RFC 3963—Network Mobility (NEMO) Basic Support Protocol," Jan. 2005, The Internet Society, Reston Virginia.

Droms, "RFC 2131—Dynamic Host Configuration Protocol," Mar. 1997, The Internet Society, Reston Virginia.

Droms et al., "RFC 3315—Dynamic Host Configuration Protocol for IPv6 (DHCPv6)," Jul. 2003, The Internet Society, Reston Virginia.

Droms, "RFC 3736—Stateless Dynamic Host Configuration Protocol (DHCP) Service for IPv6," Apr. 2004, The Internet Society, Reston Virginia.

Koodli et al., "RFC 3357—One-way Loss Pattern Sample Metrics," Aug. 2002, The Internet Society, Reston Virginia.

Yokota et al., "Mobile IPv6 Fast Handovers for 3G CDMA Networks," Jul. 10, 2005, Internet-Draft, Network Working Group, The Internet Society, Reston, Virginia.

\* cited by examiner

METHOD AND SYSTEM FOR OBTAINING HOME AGENT INFORMATION OF A MOBILE NODE

CROSS-REFERENCE TO RELATED APPLICATIONS

This application is a continuation of International Patent Application No. PCT/CN2006/001296, filed Jun. 13, 2006, which claims priority to Chinese Patent Application No. 200510098647.3, filed Sep. 7, 2005, both of which are hereby incorporated by reference.

FIELD OF THE INVENTION

The present invention relates to network communication technologies and in particular to a method and system for obtaining home agent information of a mobile node.

BACKGROUND OF THE INVENTION

The Dynamic Host Configuration Protocol (DHCP) provides a mechanism to dynamically specify an IP address and other configuration parameters of a host. In a network where the location of a host frequently changes, DHCP allocates and manages IP addresses and other parameters of hosts dynamically. When a host joins a network, the host can obtain an IP address and other parameters dynamically from a DHCP server in the network and establish a channel automatically for communication with other hosts.

DHCP is available in two versions, v4 and v6, which serve in IPv4 and IPv6 networks respectively. DHCPv6 may be stateful and stateless. In the stateful mode, a terminal obtains an IP address and other configuration information simultaneously from a DHCPv6 server. In the stateless mode, a terminal obtains only some state-unrelated information, like domain name server (DNS) information, from a DHCPv6 server after obtaining an IP address manually or by other means.

In a mobile IP network or a NEMO (Network Mobility, NEMO), a mobile node (MN) may first obtain a home address from a DHCP server and register the home address in a home agent. When the MN moves from a home link to a foreign link, the MN can obtain a care-of address automatically from a stateful or stateless DHCP server and register the care-of address in the home agent. Thus, the MN and a correspondent node can communicate over a bidirectional tunnel or through route optimization. Therefore, the basis for an MN to continue with subsequent interactions is that the MN obtains the IP address information of a home agent.

The current method defined in Request For Comments (RFC) for obtaining the home agent address is: when the MN does not know the home agent address or when the home agent address changes, that is, after the MN obtains the care-of address, the MN sends a Home Agent Discovery message to anycast addresses of mobile IPv6 home agents, or broadcasts a Home Agent Discovery message over mobile IPv4; the home agent receives the Discovery message and sends a response message to the MN; the MN extracts the address information of the home agent of the MN from the response message.

RFC defines only the method for obtaining the home agent address through a Home Agent Discovery message after the MN obtains the care-of address. It does not define a method for an MN to obtain the home agent address when the MN is started up on a home link. In addition, after the MN obtains the care-of address, the MN needs to exchange many messages with the home link to obtain the home agent address. This compromises the handover speed of the MN.

SUMMARY OF THE INVENTION

Embodiments of the present invention disclose a method and system for obtaining home agent information of an MN, which enable an MN to quickly obtain of the correct home agent information of the MN, increasing the efficiency in obtaining the home agent information of the MN, refining the RFC and improving the handover speed of the MN.

The method disclosed by one embodiment of the invention includes:

a. obtaining the home agent information of the MN, by a DHCPv6 server, when receiving a request message from an MN and; and b. carrying, by the DHCPv6 server, the home agent information in a response message and sending the response message to the MN.

Another embodiment of the invention discloses a system for obtaining the home agent information of an MN. The system includes a DHCPv6 server and an MN, wherein the DHCPv6 server obtains the home agent information of an MN from the storage module when the DHCPv6 server receives a request message from the MN, adds the home agent information into the response message and sends the response message to the MN.

In one embodiment of the present invention, with request message and response message transmitted between an MN and a DHCP server, the MN obtains the MN's home agent information such as the home agent address simultaneously when the MN receives the response message to the MN's request message. When the request message is a message for home address information, the MN can obtain the MN's home agent information when the MN is started up on a home link, with a clearly defined procedure for obtaining home agent information at the startup of the MN on a home link. When the request message is a message for a care-of address information or state-unrelated information, the MN can obtain the MN's home agent information simultaneously when the MN obtains the care-of address information or other information, which avoids a special message interaction procedure for obtaining the home agent information. Embodiments of the invention are applicable to both mobile IPv6 and mobile networks. By setting the home agent information of MNs on a DHCP server, the method in one embodiment of the invention is easy to implement. The technical solutions of embodiments of the invention increase the efficiency in obtaining home agent information, refine the RFC and improve the handover speed of MNs.

DETAILED DESCRIPTION OF THE INVENTION

Figure 1:
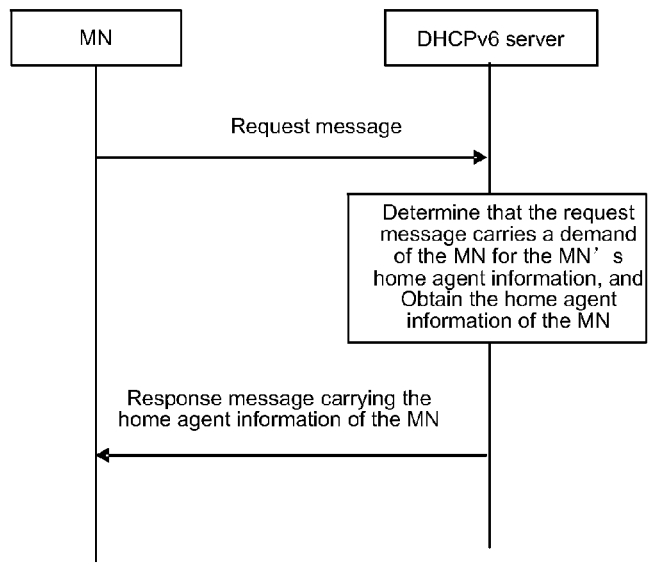
FIG. 1 shows the method for obtaining home agent information of MNs according to an embodiment of the invention.

One embodiment of the invention disclose a method for obtaining home agent information of a mobile node, the method includes: a DHCPv6 server obtains the home agent information of an MN when the DHCPv6 server receives a request message from the MN, and the DHCPv6 server sends to the MN a response message which carries the home agent information the DHCPv6 server obtains.

The present invention is further detailed with reference to the accompanying drawings.

The method provided by embodiments of the invention for obtaining home agent information like the home agent address information of an MN is applicable to mobile an IPv6 network and a NEMO network. The MN may obtain the MN's home agent information in parallel with the process of the MN obtains the MN's home address, care-of address or state-unrelated information.

The following takes the process of obtaining the home agent address information of an MN to further detail the method available in stateful and stateless modes.

Method 1: Obtaining the home agent information of an MN in a mobile IPv6 network or a NEMO network in the stateful mode.

In the method, when an MN needs to request some information, such as a home address or care-of address, from a DHCPv6 server, the MN sends some request message, such as a DHCPv6-based home address request message or care-of address request message, to the DHCPv6 server. When the MN sends the request message, the request message carries a demand for home agent information.

The demand for home agent information may be carried in an extended option of the request message. For example, an OPTION_MOBILITY may be added to the basic format of a DHCPv6 request message; the OPTION_MOBILITY includes three fields and contents: option-code, option-len and option-data.

When the DHCPv6 server receives the request message from the MN and determines that the request message includes an OPTION_MOBILITY indicating the demand for home agent information, the DHCPv6 server obtains the home agent address of the MN according to the content of the OPTION_MOBILITY. The DHCPv6 server carries the home agent address information in the response message and sends the response message to the MN. The response message may be a response message to a home address request message or a response message to a care-of address request message.

There are different methods for the DHCPv6 server to obtain the home agent address information of the MN, for example, from another network entity, or from the information preset and stored in the DHCPv6 server. For instance, the DHCPv6 server obtains some information relative to the home agent address information from the network management system or another system (storage module) where home agent address information is configured, and stores the home agent address in the DHCPv6 server.

The home agent address information of the MN may be carried in an extended option of the response message. For example, an OPTION_MOBILITY may be added to the basic format of a DHCPv6 response message; the OPTION_MOBILITY includes three fields and contents: option-code, option-len and option-data.

The format of OPTION_MOBILITY in the request message and the response message is shown in

TABLE 1

```
 0                   1                   2                   3 byte
 0 1 2 3 4 5 6 7 8 9 0 1 2 3 4 5 6 7 8 9 0 1 2 3 4 5 6 7 8 9 0 1 bit
+-+-+-+-+-+-+-+-+-+-+-+-+-+-+-+-+-+-+-+-+-+-+-+-+-+-+-+-+-+-+-+-+
|   OPTION_MOBILITY       |          option-len                 |
+-+-+-+-+-+-+-+-+-+-+-+-+-+-+-+-+-+-+-+-+-+-+-+-+-+-+-+-+-+-+-+-+
|                                                               |
|           Home-Agent-Address1 (IPv6 address) or               |
|                    Home-Address                               |
|                                                               |
+-+-+-+-+-+-+-+-+-+-+-+-+-+-+-+-+-+-+-+-+-+-+-+-+-+-+-+-+-+-+-+-+
|                                                               |
|           Home-Agent-Address2 (IPv6 address)                  |
|                                                               |
|                                                               |
+-+-+-+-+-+-+-+-+-+-+-+-+-+-+-+-+-+-+-+-+-+-+-+-+-+-+-+-+-+-+-+-+
|                           ...                                 |
+-+-+-+-+-+-+-+-+-+-+-+-+-+-+-+-+-+-+-+-+-+-+-+-+-+-+-+-+-+-+-+-+

0                   1                   2                   3
                                                              octets
```

When the OPTION_MOBILITY in Table 1 is applicable to a request message, the option-code indicates that the OPTION_MOBILITY includes a demand of the MN for the MN's home agent information. This means, when the option-code of the OPTION_MOBILITY is a first preset value, such as 200, the OPTION_MOBILITY includes a demand of the MN for the MN's home agent information. The first preset value will be requested from the related standardization organization, such as the Internet Engineering Task Force (IETF). The option-len field indicates the length of the option-data of the OPTION_MOBILITY, and also indicates whether the MN resides in a home link or a foreign link. When the option-len is a second preset value, such as 0, the MN resides in a home link, while the option-data is a third preset value, for instance, null. When the option-len is a fourth preset value, such as 16, the MN resides in a foreign link, while the option-data indicates the home address information of the MN.

When the OPTION_MOBILITY in Table 1 is applicable to a response message, the option-code indicates that the OPTION_MOBILITY includes the home agent information of the MN. This means, when the option-code is the first preset value, like 200, the OPTION_MOBILITY includes the home agent information of the MN. The first preset value will be requested from the related standardization organization. The option-len field indicates the length of the option-data, that is, the length of the home agent information of the MN, which is an integral multiple of 16 octets. The option-data field carries the home agent address information of the MN.

The following describes the implementation of method 1 in detail with reference to Table 1.

Addresses information of home agents in the network is preset on a DHCPv6 server. The addresses information may be sorted according to the link prefixes of home links. If a home link matches a plurality of home agent addresses information, the home agent addresses information is prioritized to form a home agent address list.

When an MN on a home link requests a home address through the DHCPv6 server, the MN sets the option-code in a home address request message as 200, option-len as 0 and option-data as null, and sends the request. The option-len field is set to 0, indicating that the MN wishes to lease an IP address for a long time as the home address.

The DHCPv6 server receives the home address request information from the MN and returns an IP address with a long lease term to the MN as the MN's home address. When the DHCPv6 server determines that the option-len field is 0 in the OPTION_MOBILITY wherein the option-code is 200, the DHCPv6 server further determines the prefix of the link that transmits the home address request message (using the standard method defined in DHCPv6, by extracting appropriate bits from the IPv6 address according to the length of a link prefix, which is usually set in the DHCPv6 request message), and matches an entry in the home agent address list, and the home agent address list is stored in the DHCPv6 server according to the prefix of the transmitting link. The DHCPv6 server adds the home agent address information to the option-data field of the OPTION_MOBILITY in the response message. The home agent addresses information carried in the option-data may be prioritized. The DHCPv6 server sets the option-code in the OPTION_MOBILITY of the response message as 200, and option-len as the length of the home agent address information carried in the option-code. This length is an integral multiple of 16 octets. The DHCPv6 server binds the home address of the MN with the home agent address information sent to the MN.

The MN receives the response message to the MN's home address request message and selects one from the home agent addresses information carried in the option-data of the OPTION_MOBILITY, as the MN's home agent; wherein the option-code of the OPTION_MOBILITY is 200.

When an MN residing in a foreign link requests a care-of address from a DHCPv6 server, the MN sets the option-code in the care-of address request message as 200, option-len as 16 and option-data as the home address information of the MN, and sends the care-of address request message. That the option-len value is set as 16 indicates that the MN resides in a foreign link.

When the DHCPv6 server receives the care-of address request message from the MN, the DHCPv6 server returns to the MN a response message that carries the care-of address information. When the DHCPv6 server determines that the option-len is 16 in the OPTION_MOBILITY wherein the option-code is 200, the DHCPv6 server obtains the home address information from the option-data in the OPTION_MOBILITY, and according to the home address information the DHCPv6 server obtains, the DHCPv6 server determines the corresponding home agent address information of the MN from the binding information between home addresses and home agent addresses of the MN. The DHCPv6 server carries the home agent address information into the option-data field of the OPTION_MOBILITY in the response message. The home agent addresses information in the option-data may be prioritized. In the response message to the care-of address request message, the DHCPv6 server sets the option-code in the OPTION_MOBILITY as 200, and option-len as the length of the home agent address information carried in the option-code. This length is an integral multiple of 16 octets.

The MN receives the response message to the MN's care-of address request message and selects one from the home agent addresses information carried in the option-data in the OPTION_MOBILITY, as its home agent; wherein the option-code of the OPTION_MOBILITY is 200.

Method 2: Obtaining the home agent information of an MN in a mobile IPv6 or a NEMO network in the stateless mode.

Method 2 is similar to method 1. The difference is that in method 2, the MN does not send a home address request message or a care-of address request message to the DHCPv6 server, but an Information-request message which is not relative to the state; and accordingly, the DHCPv6 server sends a response message named Reply message to the MN. Each of the Information-request message and the Reply message includes an OPTION_MOBILITY. The mapping between home links and home agent addresses information based on the link prefixes (or the home agent address list), the binding between home address information and home agent address information that the DHCPv6 server stores, the setting of OPTION_MOBILITY in a request message, and the setting of OPTION_MOBILITY in a response message are all similar to those in method 1.

The following describes the implementation of method 2 in detail with reference to FIG. 1.

Step 1-1: When an MN requests state-unrelated information from a DHCPv6 server via a home link, the MN sets the option-code in the OPTION_MOBILITY in the Information-request message as 200, option-len as 0, and option-data as null, and sends the Information-request message.

In step 1-1, if the MN requests state-unrelated information from a DHCPv6 server via a foreign link, the MN sets the option-code in the OPTION_MOBILITY in the Information-request message as 200, option-len as 16, and option-data as the home address of the MN, and sends the Information-request message.

Step 1-2: The DHCPv6 server receives the Information-request message from the MN, and returns the information requested. When the DHCPv6 server determines that the option-len is 0 in the OPTION_MOBILITY wherein the option-code is 200, the DHCPv6 server further determines the sending link of the Information-request message, and determines the entry matching the link prefix from the home agent address list the DHCPv6 server stores. When the option-len is 16 in the OPTION_MOBILITY wherein the option-code is 200, the DHCPv6 server obtains the home address information of the MN from the option-data in the OPTION_MOBILITY, and determines the home agent address information matching the home address information of the MN from the binding information between home addresses information and home agent addresses the DHCPv6 server stores.

Step 1-3: The DHCPv6 server carries the home agent address information of the MN in the option-data field of the OPTION_MOBILITY in the response message. The home agent addresses information carried in the option-data may be prioritized. Then, the DHCPv6 server sets the option-code in the OPTION_MOBILITY of the response message as 200, and option-len as the length of the home agent address information carried in the option-data. This length is an integral multiple of 16 octets.

Step 1-4: The MN receives the response message to the MN's information-request message and selects one from the home agent addresses information carried in the option-data in the OPTION_MOBILITY and the option-code in the OPTION_MOBILITY is 200, as the MN's home agent.

Figure 2:
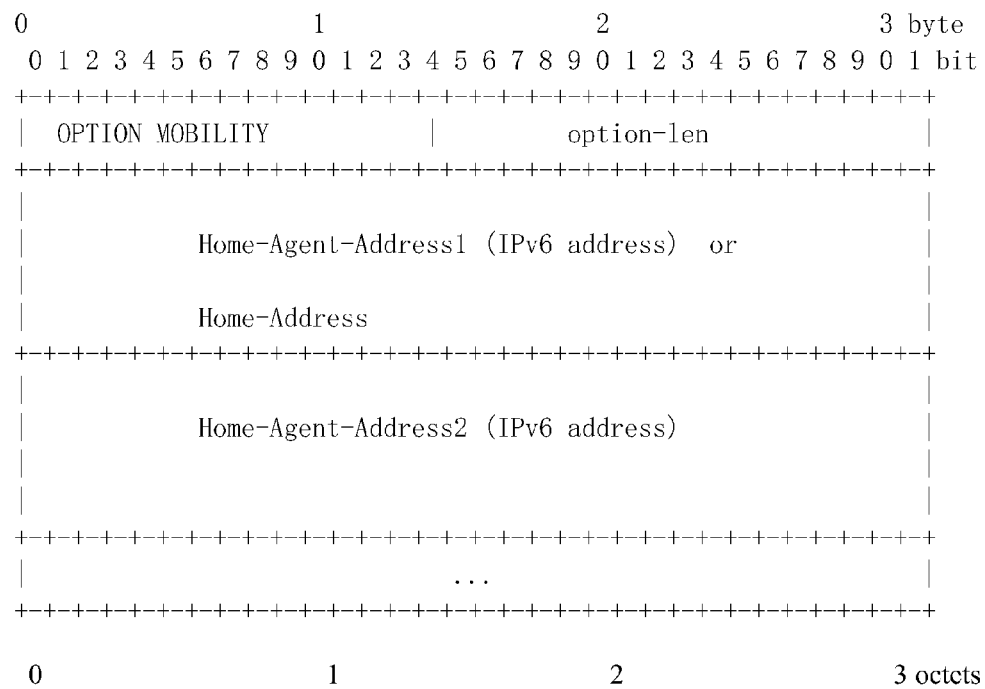
FIG. 2 shows the format of OPTION_MOBILITY in the request message and the response message.
Figure 3:
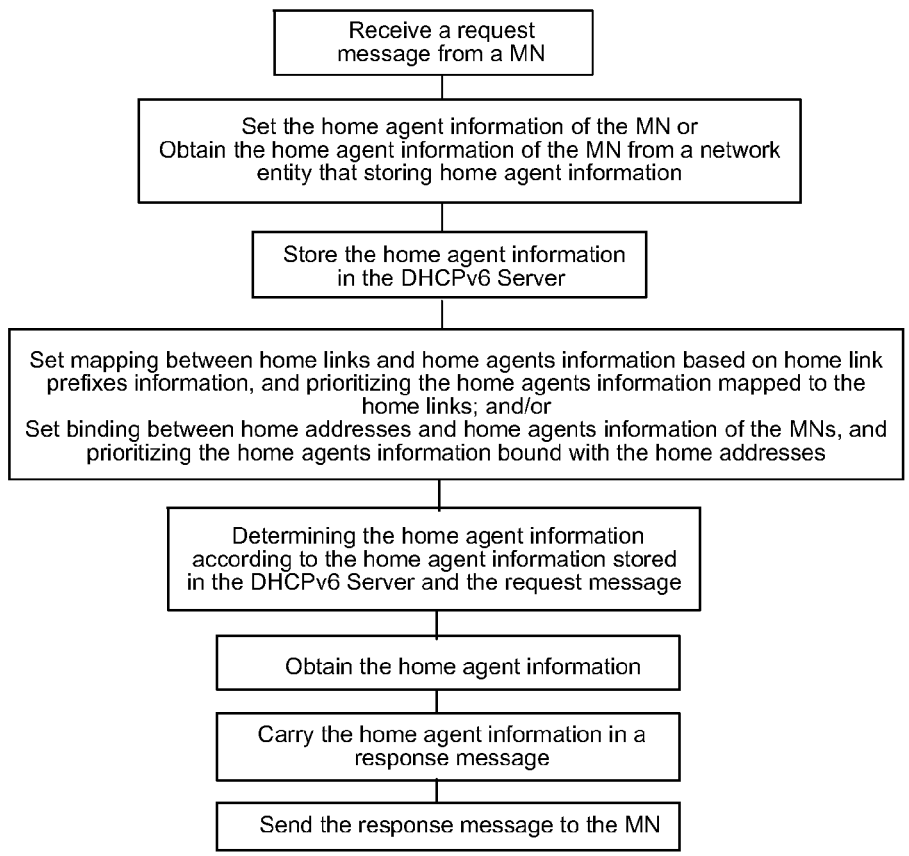
FIG. 3 shows the method for obtaining home agent information of MNs according to another embodiment of the invention.
Figure 4:
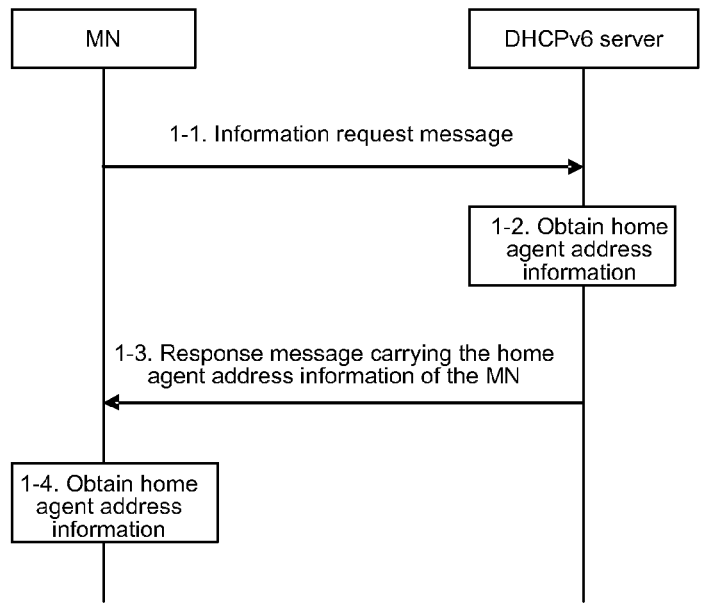
FIG. 4 shows the method for obtaining home agent information of MNs according to another embodiment of the invention.
Figure 5:
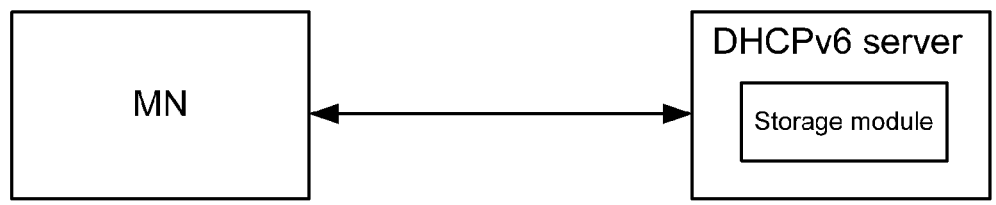
FIG. 5 shows the system for obtaining home agent information of MNs according to an embodiment of the invention.
Figure 6:
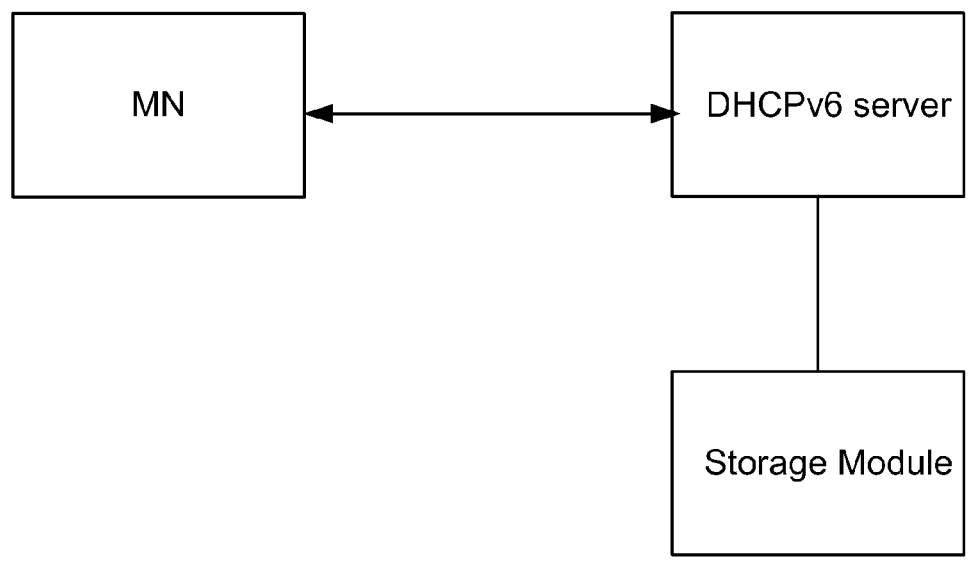
FIG. 6 shows the system for obtaining home agent information of MNs according to another embodiment of the invention.

As shown in FIG. 2, a system provided by an embodiment of the invention for obtaining the home agent information of an MN substantially includes an MN and a DHCPv6 server.

The MN sends a request message to the DHCPv6 server to obtain the MN's home agent information; the DHCPv6 server obtains the home agent information of the MN according to the request message from the MN, carries the home agent information in a response message to the request message, and sends the response message to the MN.

In another embodiment of the invention, the system for obtaining the home agent information of an MN further includes a storage module (not indicated in a drawing). The storage module stores address information of home agents in the network. The home agent addresses information are sorted according to the home link prefixes and may be stored in the form of a home agent address information list. The home agent address information and the home address information of an MN may be bound with the MN's home address information and stored when an MN obtains the MN's home agent address information via a home address request message. The particulars are given in the preceding method description. The storage module is similar to a network management system or another system where some information relative to home agent address information is configured.

In another embodiment of the invention, the storage module may be directly arranged in a DHCPv6 server.

When the DHCPV6 server receives a request message, such as a home address request message, a care-of address request message or an information request message from an MN, the DHCPV6 server determines the prefix of the home link of the MN according to the sending link of the request message and determines the home agent address information of the MN through the prefix and the home agent address list the DHCPv6 server stores; the DHCPV6 server may also extract the home address information of the MN from the option-data field of the OPTION_MOBILITY in the request message wherein the option-code is 200 and the option-len is 16, and determines the home agent address information of the MN according to the binding information between home addresses information and home agent addresses information. Then the DHCPV6 server carries the home agent address information of the MN in the response message and sends the response message to the MN. The particulars are given in the preceding method description.

Although the invention has been described through some exemplary embodiments, the invention is not limited to such embodiments. It is apparent that those skilled in the art can make various modifications and variations to the invention without departing from the spirit and scope of the invention. The claims in the application file of the invention are intended to cover the modifications and variations provided that they fall in the scope of protection defined by the following claims or their equivalents.

What is claimed is:

1. A method for obtaining home agent information of a mobile node (MN), comprising:
   receiving, by a DHCPv6 server, a DHCPv6-based request message carrying a demand for home agent information from the MN when the MN is started up;
   obtaining, by the DHCPv6 server, the home agent information of the MN stored in the DHCPv6 server according to the received DHCPv6-based request message; and
   carrying, by the DHCPv6 server, the home agent information in a DHCPv6-based response message and sending the response message to the MN;
   wherein the demand for home agent information from the MN is carried in an extended option of the request message, in which the extended option is named as OPTION_MOBILITY and added to a format of the request message; and the extended option comprises an option-code field, an option-len field and an option-data field, in which the content in the option-code field of the request message indicates that the demand for home agent information from the MN is included in the extended option, and the content in the option-len field and option-data field indicates that the MN resides in a home or a foreign link; when the request message indicates that the MN intends to obtain the MN's home agent information and that the MN resides in the home link, the content in the option-code field is a first preset value, the content in the option-len is a second preset value, and the content in the option-data is a third preset value; and when the request message indicates that the MN intends to obtain the MN's home agent information and that the MN resides in the foreign link, the content in the option-code field is the first preset value, the content in the option-len field is a forth preset value, and the content in the option-data field specifies a home address information of the MN.

2. The method of claim 1, before obtaining the home agent information of the MN, further comprising:
   setting the home agent information of the MN on the DHCPv6 server, or
   obtaining the home agent information of the MN from a network entity that stores home agent information; and
   storing the home agent information by the DHCPv6 server;
   wherein obtaining the home agent information of the MN further comprising:
   determining, by the DHCPv6 server, the home agent information of the MN, according to the home agent information stored in the DHCPv6 server and the received request message.

3. The method of claim 2, wherein the setting the home agent information of the MN on the DHCPv6 server, or, obtaining the home agent information of the MN from the network entity that storing home agent information, and storing the home agent information by the DHCPv6 server comprise:
   setting, on the DHCPv6 server, mapping between home links and home agents information based on home link prefixes information, and prioritizing the home agents information mapped to the home links; and/or
   setting, on the DHCPv6 server, binding between home addresses and home agents information of the MNs, and prioritizing the home agents information bound with the home addresses.

4. The method of claim 3, wherein the determining, by the DHCPv6 server, the home agent information of the MN, according to the home agent information stored in the DHCPv6 server and the received request message comprises:
   determining, by the DHCPv6 server, link prefix of a link of the received request message and determining the home agent information that matches the link prefix of the link according to the home agent information stored in the DHCPv6 server; or
   determining, by the DHCPv6 server, the home address information carried in the request message and determining the home agent information that matches the home address information according to the binding stored in the DHCPv6 server.

5. The method of claim 1, wherein, in the step of carrying, by the DHCPv6 server, the home agent information is carried in an extended option of the response message, and the extended option is named as OPTION_MOBILITY and added to a format of the response message.

6. The method of claim 5, wherein the extended option comprises an option-code field, an option-len field and an option-data field, in which the content in the option-code field of the response message indicates that the home agent information of the MN is included in the extended option, the content in the option-len field indicates length of the home agent information, and the content in the option-data field is the home agent information.

7. The method of claim 5, wherein the carrying, by the DHCPv6 server, the home agent information in the response message and sending the response message to the MN further comprises:

determining, by the DHCPv6 server, the home agent information of the MN and binding and storing the home address information and home agent information of the MN, when the DHCPv6 server sends the home address information to the MN.

8. The method of claim 1, wherein the home agent information comprises home agent address information.

9. The method of claim 1, wherein the request message is a home address request message based on stateful DHCPv6, or a care-of address request message based on stateful DHCPv6, or an information-unrelated state request message based on stateless DHCPv6.

10. A system for obtaining home agent information of a mobile node (MN) comprising:
 an MN, adapted to send a DHCPv6-based request message carrying a demand for home agent information to request home agent information when the MN is started up; and
 a DHCPv6 server, adapted to obtain the home agent information of the MN stored in the DHCPv6 server according to the request message upon receiving the request message from the MN, carry the home agent information in a DHCPv6-based response message and send the response message to the MN;
 wherein the demand for home agent information from the MN is carried in an extended option of the request message, in which the extended option is named as OPTION_MOBILITY and added to a format of the request message; and the extended option comprises an option-code field, an option-len field and an option-data field, in which the content in the option-code field of the request message indicates that the demand for home agent information from the MN is included in the extended option, and the content in the option-len field and option-data field indicates that the MN resides in a home or a foreign link; when the request message indicates that the MN intends to obtain the MN's home agent information and that the MN resides in the home link, the content in the option-code field is a first preset value, the content in the option-len is a second preset value, and the content in the option-data is a third preset value; and when the request message indicates that the MN intends to obtain the MN's home agent information and that the MN resides in the foreign link, the content in the option-code field is the first preset value, the content in the option-len field is a forth preset value, and the content in the option-data field specifies a home address information of the MN.

11. The system of claim 10, further comprising a storage module, adapted to store information related to the home agent information of the MN, wherein:
 the DHCPv6 server obtains the home agent information of the MN from the storage module when the DHCPv6 server receives the request message from the MN.

12. The system of claim 10, wherein the DHCPv6 server further comprises a storage module adapted to store the home agent information of the MN.

\* \* \* \* \*